United States Patent
Mullins et al.

(10) Patent No.: US 9,978,174 B2
(45) Date of Patent: May 22, 2018

(54) REMOTE SENSOR ACCESS AND QUEUING

(71) Applicant: DAQRI, LLC, Los Angeles, CA (US)

(72) Inventors: Brian Mullins, Altadena, CA (US); Matthew Kammerait, Studio City, CA (US); Christopher Broaddus, Santa Clara, CA (US)

(73) Assignee: DAQRI, LLC, Los Angeles, CA (US)

( * ) Notice: Subject to any disclaimer, the term of this patent is extended or adjusted under 35 U.S.C. 154(b) by 0 days. days.

(21) Appl. No.: 15/393,257

(22) Filed: Dec. 29, 2016

(65) Prior Publication Data

US 2017/0109923 A1    Apr. 20, 2017

Related U.S. Application Data

(63) Continuation of application No. 14/467,700, filed on Aug. 25, 2014, now Pat. No. 9,578,399.

(51) Int. Cl.
| | |
|---|---|
| *G08C 19/22* | (2006.01) |
| *G06T 17/00* | (2006.01) |
| *H04Q 9/00* | (2006.01) |
| *G06F 3/01* | (2006.01) |
| *G06T 19/00* | (2011.01) |

(52) U.S. Cl.
CPC .............. *G06T 17/00* (2013.01); *G06F 3/011* (2013.01); *G06T 19/006* (2013.01); *H04Q 9/00* (2013.01); *G06T 2215/16* (2013.01); *H04Q 2209/84* (2013.01)

(58) Field of Classification Search
CPC ....... G06F 3/011; G06T 17/00; G06T 19/006; G06T 2215/16; H04Q 2209/84; H04Q 9/00
See application file for complete search history.

(56) References Cited

U.S. PATENT DOCUMENTS

| | | |
|---|---|---|
| 2009/0006589 A1 | 1/2009 | Forbes et al. |
| 2012/0249741 A1 | 10/2012 | Maciocci et al. |
| 2013/0090981 A1 | 4/2013 | Shankaranarayanan et al. |
| 2013/0222369 A1 | 8/2013 | Huston et al. |
| 2013/0293468 A1 | 11/2013 | Perez et al. |
| 2014/0204077 A1 | 7/2014 | Kamuda et al. |
| 2014/0344139 A1 | 11/2014 | Smith et al. |
| 2016/0057511 A1 | 2/2016 | Mullins et al. |

FOREIGN PATENT DOCUMENTS

WO    WO-2016032899 A1    3/2016

OTHER PUBLICATIONS

"U.S. Appl. No. 14/467,700, Amendment Under 37 CFR filed Nov. 1, 2016", 3 pgs.

(Continued)

*Primary Examiner* — Thomas McCormack

(74) *Attorney, Agent, or Firm* — Schwegman Lundberg & Woessner, P.A.

(57) ABSTRACT

An application generates instructions to a wearable device to remotely activate a sensor in the wearable device and to receive sensor data from the sensor. A query related to a physical object is received. Instructions to wearable devices are generated to remotely activate at least one sensor of the wearable devices in response to the query. Sensor data is received from at least one of the wearable devices in response to that wearable device being within a range of the physical object.

20 Claims, 12 Drawing Sheets

(56) References Cited

OTHER PUBLICATIONS

"U.S. Appl. No. 14/467,700, Non Final Office Action dated Mar. 10, 2016", 15 pgs.
"U.S. Appl. No. 14/467,700, Notice of Allowability dated Nov. 10, 2016", 2 pgs.
"U.S. Appl. No. 14/467,700, Notice of Allowability dated Dec. 16, 2016", 2 pgs.
"U.S. Appl. No. 14/467,700, Notice of Allowance dated Oct. 4, 2016", 5 pgs.
"U.S. Appl. No. 14/467,700, Response filed Jul. 11, 2016 to Non Final Office Action dated Mar. 10, 2016", 10 pgs.
"International Application Serial No. PCT/US2015/046321, International Preliminary Report on Patentability dated Sep. 8, 2016", 7 pgs.
"International Application Serial No. PCT/US2015/046321, International Search Report dated Dec. 7, 2015", 2 pgs.
"International Application Serial No. PCT/US2015/046321, Written Opinion dated Dec. 7, 2015", 5 pgs.

REMOTE SENSOR ACCESS AND QUEUING

PRIORITY APPLICATION

This application is a continuation of and claims priority to U.S. patent application Ser. No. 14/467,700, filed Aug. 25, 2014, the disclosure of which is incorporated herein in its entirety by reference.

TECHNICAL FIELD

The subject matter disclosed herein generally relates to the processing of data. Specifically, the present disclosure addresses systems and methods for remotely accessing sensor data from wearable devices.

BACKGROUND

A device can be used to generate and display data in addition to an image captured with the device. For example, augmented reality (AR) is a live, direct or indirect, view of a physical, real-world environment whose elements are augmented by computer-generated sensory input such as sound, video, graphics or GPS data. With the help of advanced AR technology (e.g. adding computer vision, object recognition, and other complimentary technologies) the information about the surrounding real world of the user becomes interactive. Device-generated (e.g., artificial) information about the environment and its objects can be overlaid on the real world.

BRIEF DESCRIPTION OF THE DRAWINGS

Some embodiments are illustrated by way of example and not limitation in the figures of the accompanying drawings.

DETAILED DESCRIPTION

Figure 1:
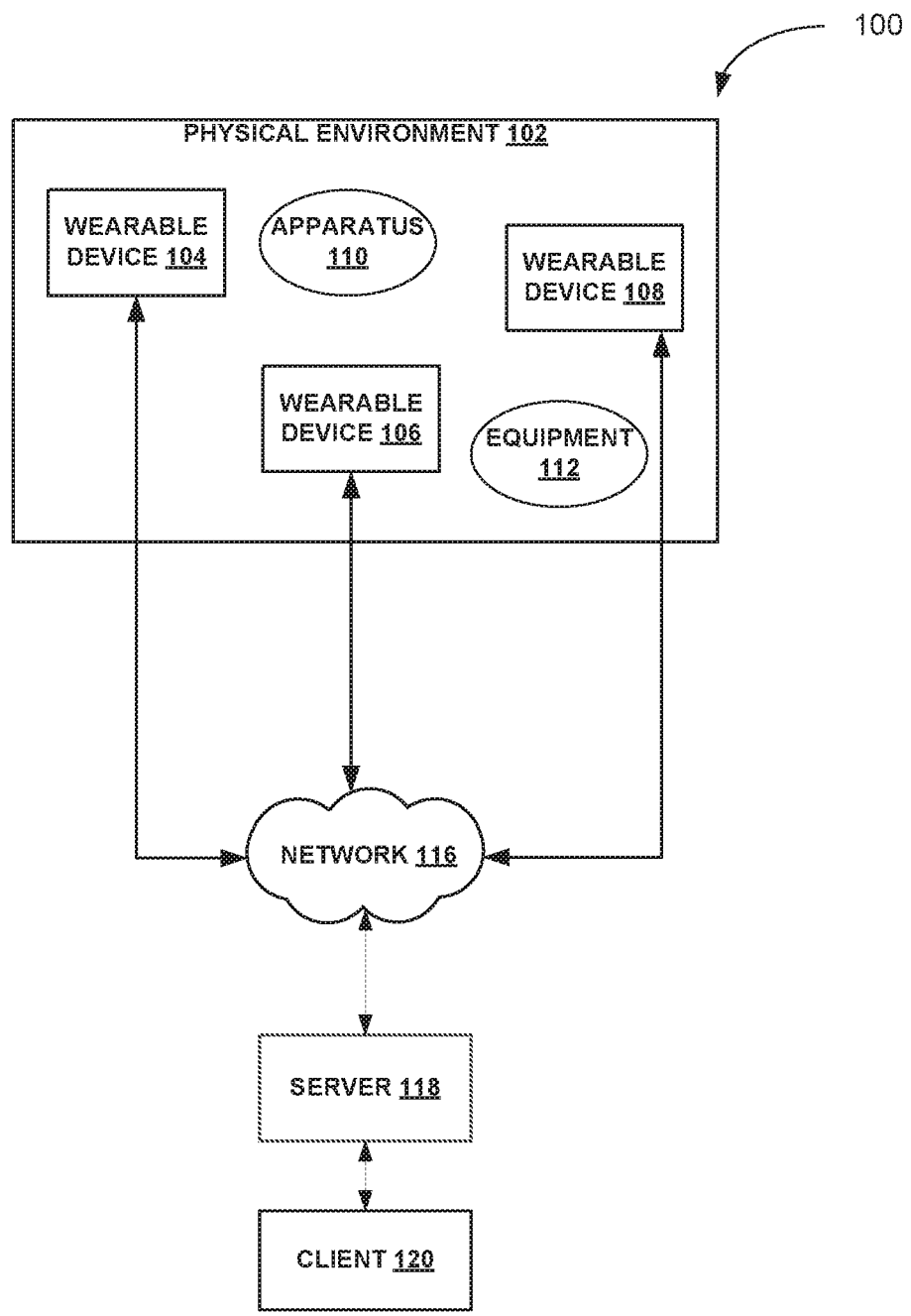
FIG. 1 is a block diagram illustrating an example of a network suitable for a remote sensor access system, according to some example embodiments.

Example methods and systems are directed to remotely accessing sensor data from wearable devices. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

Augmented reality (AR) applications allow a user to experience information, such as in the form of a three-dimensional (3D) virtual object overlaid on an image of a physical object captured by a camera of a wearable device. The physical object may include a visual reference that the AR application can identify. A visualization of the additional information, such as the 3D virtual object overlaid or engaged with an image of the physical object is generated in a display of the device. The 3D virtual object may selected based on the recognized visual reference or captured image of the physical object. A rendering of the visualization of the 3D virtual object may be based on a position of the display relative to the visual reference. Other AR applications allow a user to experience visualization of the additional information overlaid on top of a view or an image of any object in the real physical world. The virtual object may include a 3D virtual object, a two-dimensional (2D) virtual object. For example, the 3D virtual object may include a three-dimensional view of a chair or an animated dinosaur. The 2D virtual object may include a 2D view of a dialog box, menu, or written information such as statistics information for a baseball player. An image of the virtual object may be rendered at the wearable device.

Multiple wearable devices (e.g., mobile devices that include a camera and a display) looking at a same physical object from different angles and locations may be further used to generate and reconstruct a 3D model of the physical object. In one example, the physical object includes a gauge. Instrument reading such as a current level from the gauge can be read and extracted.

An application generates instructions to a wearable device to remotely activate a sensor in the wearable device and to receive sensor data from the sensor. A query related to a physical object is received. Instructions to wearable devices are generated to remotely activate at least one sensor of the wearable devices in response to the query. Sensor data is received from at least one of the wearable devices in response to that wearable device being within a field of use range of the physical object.

In one example embodiment, a wearable device includes a helmet with at least one camera, at least one depth sensor, at least one inertial sensor, and a visor comprising a transparent display that displays augmented reality content based on the sensor data.

In one example embodiment, the camera, depth sensor, and inertial sensor of the wearable device are remotely activated. Sensor data may include a video feed from a corresponding wearable device, depth sensor data from the corresponding wearable device, an orientation of the corresponding wearable device, and a location of the corresponding wearable device.

In one example embodiment, the query identifies the physical object and a location of the physical object and includes a request for a 3D model of the physical object. A determination is made as to whether any of the wearable devices are within the field of use range of the physical object based the identification of the physical object and the location of the physical object relative to the wearable devices. The field of use range corresponds to a threshold sensor range within which a 3D model of the physical object is built based on the sensor data. Measurements readings (e.g., current level from a gauge) generated at the physical object may be extracted from the sensor data.

In another example embodiment, a non-transitory machine-readable storage device may store a set of instructions that, when executed by at least one processor, causes the at least one processor to perform the method operations discussed within the present disclosure.

FIG. 1 is a network diagram illustrating a network environment 100 suitable for operating a remote sensor access system with wearable devices, according to some example embodiments. The network environment 100 includes a physical environment 102, a client 120, and a server 118. The physical environment 102 may be a factory floor, a campus, or any other defined or limited geographic environment). The physical environment 102 may include apparatus 110 and equipment 112. The apparatus 110 and equipment 112 may be stationary and fixed relative to the physical environment 102. The apparatus 110 and equipment 112 may include shelving, factory machines or devices, measurement devices, switches, gauges, and hardware. Users or operators (of machines) may wear wearable devices 104, 106, 108 and walk around apparatus 110 and equipment 112 in the physical environment 102. Each user or operator may have one or more wearable device. Each user or operator may walk about the physical environment 102 in a planned path or unplanned path. The wearable devices 104, 106, 108 may be communicatively coupled to each other, the server 118, and the client 120 via a network 116 (e.g., computer network). In one example, the apparatus 110 and equipment 112 may be capable of communicating with the network 116 to provide their respective status and functionality to the server 118. The wearable devices 104, 106, 108, the client 120, and the server 118 may each be implemented in a computer system, in whole or in part, as described below with respect to FIGS. 15 and 16. The server 118 may be part of a network-based system. For example, the network-based system may be or include a cloud-based server system that provides additional information, such as three-dimensional (3D) models and locations of components or items relative to the 3D model, to the wearable devices 104, 106, 108, and the client 120.

Each wearable device may be worn or held by a user or worker inspecting or operating on apparatus 110 and equipment 112. For example, the user may be a construction worker in a plant. The user is not part of the network environment 100, but is associated with the corresponding wearable device. In one example embodiment, each wearable device may be a computing device with a display. For example, the wearable device may include a head mounted device with a display and a camera (e.g., a helmet with a display integrated in the visor or face shield or eye shield). The display and camera may be disposed on separate devices but may be communicatively connected. The computing device may be hand held or may be removable mounted to a head of the user. In one example, the display may be a screen that displays what is captured with a camera of the wearable device. In another example, the display of the device may be transparent such as in eye shields or visors of a helmet/hardhat or in lenses of wearable computing glasses. In other examples, the display may be a transparent display so that the user visually perceived virtual objects displayed in the display connected to objects in the real world. The display may be non-transparent and wearable by the user to cover the field of vision of the user.

The wearable devices 104, 106, and 108 may be worn by users located at different locations in the physical environment 102. For example, wearable device 104 may be pointed towards apparatus 110. Wearable device 106 may be approaching a side of apparatus 110. Wearable device 108 may be pointed towards equipment 112. For example, each wearable device may be mounted to the helmet of each construction worker in the physical environment 102 (e.g., a shipyard). The workers may be located at different locations around the shipyard. The construction workers may be able to view different parts of apparatus 110 and equipment 112 at any given time. The construction workers may be users of an application in the corresponding wearable device that allows them to augment apparatus 110 and equipment 112 with a virtual 3D model of the information relevant to the apparatus 110 and equipment 112 (e.g., animation, color of status, visual cue on how to replacing a part of an engine). For example, the application may include an AR application configured to provide the construction workers with an experience triggered by the apparatus 110, equipment 112, a 2D physical object (e.g., a marking on apparatus 110), a 3D physical object (e.g., a knob on device equipment 112), a location (e.g., lobby, exit), or any visual or non-visual references (e.g., perceived corners of walls or furniture) in the real world physical environment. For example, the construction worker may point a camera of the corresponding wearable device to capture an image of the 2D physical object. The image is tracked and recognized locally in the wearable device using a local database such as a context recognition dataset module of the AR application of the wearable device. The local context recognition dataset module may include a library of virtual objects associated with real-world physical objects or references. The AR application then generates additional information corresponding to the image (e.g., a 3D model) and presents this additional information in a display of the wearable device in response to identifying the recognized image. If the captured image is not recognized locally at the wearable device, the wearable device downloads additional information (e.g., the 3D model) corresponding to the captured image, from a database of the server 118 over the network 116.

The wearable devices 104, 106, and 108 may be used to capture video and images from different angles of apparatus 110 and equipment 112. Other sensor data may be captured such as data generated by apparatus 110 and equipment 112. For example, equipment 112 may be a gauge. A reading from the gauge may be captured by the wearable devices. In one example embodiment, wearable devices 104, 106, and 108 may broadcast a video feed of what the corresponding users are looking at to the server 118. In another example, the wearable devices 104, 106, and 108 capture frames or images at periodic intervals and broadcast them to the server 118. In another example, the wearable devices 104, 106, and 108 broadcast images at regular intervals and/or based on their geographic location relative to each other and relative to the apparatus 110 and equipment 112. For example, images may be captured in a sequential pattern such as clockwise or counter-clockwise around the apparatus 110. Other examples include combination of image capture from wearable devices 104 and 108 and video feed from wearable device 106. The pattern of video/image capture may alternate based on movement, location, orientation of each wearable device. For example, if the wearable device is looking away from apparatus 110 or equipment 112, the rate of capture may be decreased or no image may be captured. In another example, if some of the wearable devices are located closer to each other relative to the proximity between the remaining wearable devices, the wearable devices that detect that they are close to each other may capture and broadcast video/images at a lower frame rate. Similarly, wearable devices that are relatively more distant from other wearable devices may capture and broadcast video/images at a higher frame rate.

The data (image data using a camera, location data using GPS or wifi, orientation data using an accelerometer, gyroscope) receives from the wearable devices 104, 106, and 108 may be used to reconstruct and generate a 3D model of apparatus 110 or equipment 112 or any other devices in the physical environment 102. For example, data captured with the wearable devices worn on construction workers at a factory plant may start capturing images/video as soon as they are in proximity to the apparatus 110 or when a distance or radius threshold is crossed. 2D images from different angles and locations around the apparatus 110 may be used to reconstruct a 3D model of the apparatus 110 using common computer vision systems with 3D object recognition algorithms. The 3D reconstruction model may be actively as an automatic post-processing step or on pull as actively related to a new query or equation introduced into the system well after the original data capture took place.

Furthermore, data received from the wearable devices 104, 106, and 108 may be provided to a computer vision object recognition system for filing and identifying objects in images and video frames. In one embodiment, the object recognition system may be part of the server 118. As such, the data from the wearable devices 104, 106, and 108 may be used to reconstruct a 3D model of the apparatus 110 but also to keep a survey or an inventory of recognized objects. For example, the server 118 may keep track of who last used a hammer, when the hammer was used, and where the hammer was last used. The server 118 may also be used to compare the 3D model of the apparatus 110 with the 3D model of a properly operating apparatus 110. In another example, the server 118 may be used to identify or alert a wearable device based on a compliance detected based on the data received from the wearable device and a reference data. For example, the server 118 may detect a switch is toggled in a wrong position based on the reference data and notify the user of the corresponding wearable device.

In one example embodiment, the server 118 may remotely activate one or more sensors from one or more wearable devices. For example, if a user is interested in receiving a video feed related to apparatus 110, the server 118 determines which wearable device is within range of the apparatus 110. The server 118 then instructs the wearable devices within range of the apparatus 110 to start broadcasting video feeds from the camera on the corresponding wearable devices. In another example, the user wearing the wearable device may be facing away from the apparatus 110. The server 118 can yet still instruct rear cameras of the wearable device to generate video feeds of the apparatus 110. The range of the sensor may be predefined as a distance from a wearable device to a physical object (e.g., apparatus 110, equipment 112).

In another example embodiment, the server 118 may determine that no wearable devices are within range of an object of interest (e.g., equipment 112). The server 118 may then queue instructions to all the wearable devices to capture a video feed or an image of the object of interest when one of the wearable devices is within range of the equipment 112. In another example, a user may seek a higher resolution 3D model of the equipment 112. In such scenario, the server 118 generates a 3D model of the equipment 112 when a minimum number of wearable devices are within range of the equipment 112. The wearable devices may be within range of the equipment 112 at the same time or asynchronously (within a time apart threshold—e.g., no less than 10 minutes apart). Other data may be captures from the wearable devices. For example, the instructions may include extracting sensor data from equipment 112 (e.g., gauge in equipment 112 reads level x). The extraction may be performed visually using a video feed of the equipment 112 without communicating with the equipment 112. For example, the equipment 112 may be "off-line" and not in communication with the network 116.

In one example embodiment, a wearable device may wish to offload some processes (tracking and rendering of virtual objects to be displayed in the wearable device) using the tracking sensors and computing resources of the server 118. The tracking sensors may be disposed throughout the physical environment 102 and used to track the location and orientation of the wearable devices externally without having to rely on the sensors internal to the corresponding wearable devices. The tracking sensors may be used additively or as failsafe/redundancy or for fine tuning. The tracking sensors may include optical sensors (e.g., depth-enabled 3D camera), wireless sensors (Bluetooth, wifi), GPS sensor, biometric sensors, and audio sensor to determine the location of the user having the wearable device, distance of the user to the tracking sensors in the physical environment (e.g., sensors placed in corners of a venue or a room), the orientation of the wearable device to track what the user is looking at (e.g., direction at which the wearable device is pointed, wearable device pointed towards a player on a tennis court, wearable device pointed at a person in a room).

The computing resources of the server 118 may be used to determine and render virtual objects based on the tracking data (generated internally with wearable device or externally with the tracking sensors). The AR rendering is therefore performed on the server 118 and streamed back to the corresponding wearable device. As such, the wearable device does not have to compute and render any virtual object and may display the already rendered virtual object in a display of the wearable device.

In another embodiment, data from the tracking sensors may be used for analytics data processing at the server 118 for analysis on usage and how the user is interacting with the physical environment. For example, the analytics data may track at what the locations (e.g., points or features) on the physical or virtual object the user has looked, how long the user has looked at each location on the physical or virtual object, how the user held the wearable device when looking at the physical or virtual object, which features of the virtual object the user interacted with (e.g., such as whether a user tapped on a link in the virtual object), and any suitable combination thereof. The wearable device receives a visualization content dataset related to the analytics data. The wearable device then generates a virtual object with additional or visualization features, or a new experience, based on the visualization content dataset.

Any of the machines, databases, or devices shown in FIG. 1 may be implemented in a general-purpose computer modified (e.g., configured or programmed) by software to be a special-purpose computer to perform one or more of the functions described herein for that machine, database, or device. For example, a computer system able to implement any one or more of the methodologies described herein is discussed below with respect to FIGS. 9-11. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 116 may be any network that enables communication between or among machines (e.g., server 118), databases, and wearable devices. Accordingly, the network 116 may be a wired network, a wireless network (e.g., a mobile or cellular network), or any suitable combination thereof. The network 116 may include one or more portions that constitute a private network, a public network (e.g., the Internet), or any suitable combination thereof.

Figure 2:
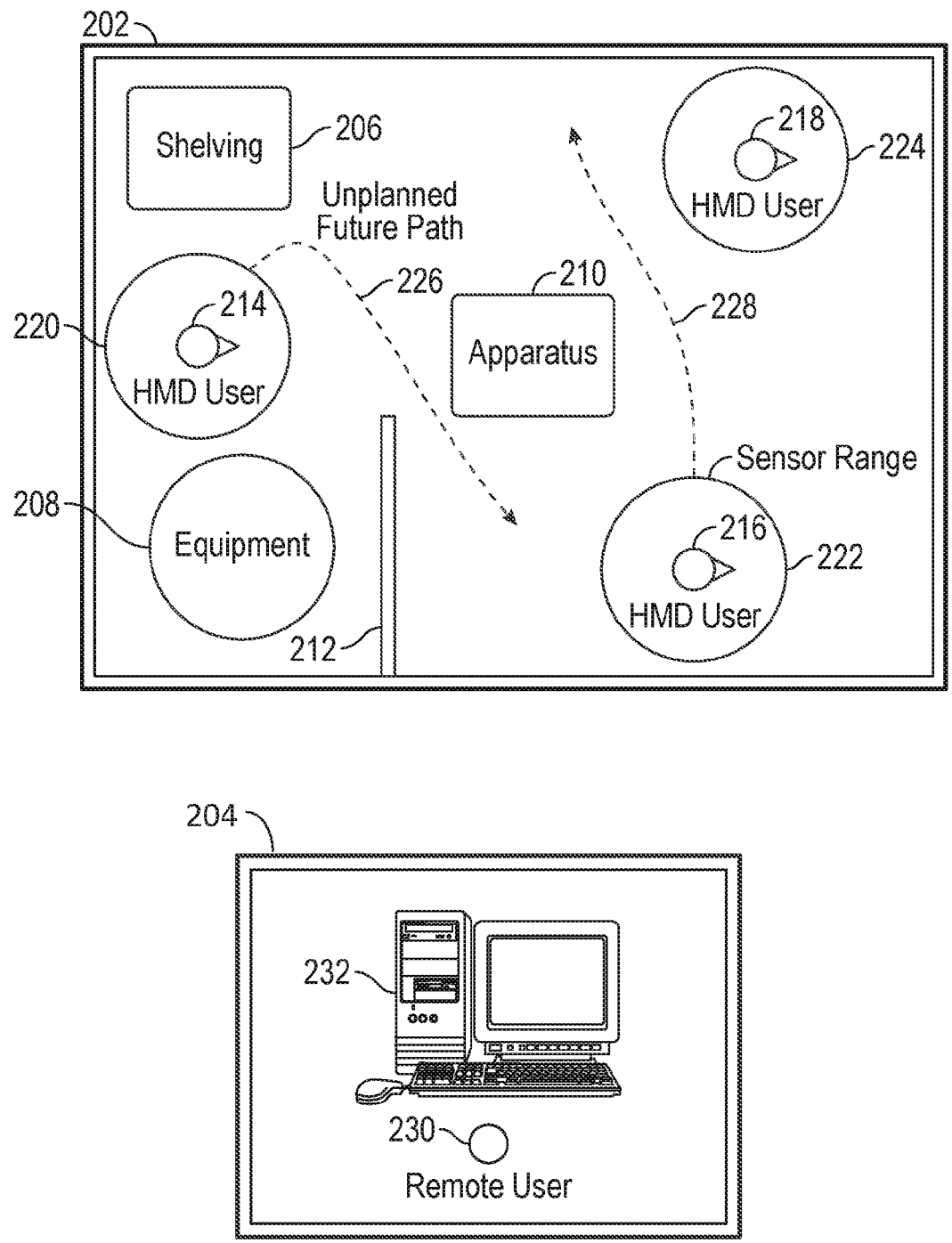
FIG. 2 is a block diagram illustrating an example of an application of the remote sensor access system in a factory.

FIG. 2 is a block diagram illustrating an example of an application of the remote sensor access system in a factory 202. A remote user 230 uses a client computer 232 at a remote location 204 to access video feeds and data from the factory 202. Head mounted device (HMD) users 214, 216, and 218 may be located at various locations within the factory 202. The HMD device of users 214, 216, and 218 may have a corresponding sensor range 220, 222, and 224. The factory 202 may include shelving 206, equipment 208, apparatus 210, and wall 212. HMD user 214 has an unplanned future travel path 226. HMD user 216 has an unplanned travel path 228. The remote user 230 may instruct the HMD devices corresponding to HMD users 214, 216 to queue recording of images and other sensor data related to apparatus 210 when the HMD devices are within range of the apparatus 210.

Figure 3:
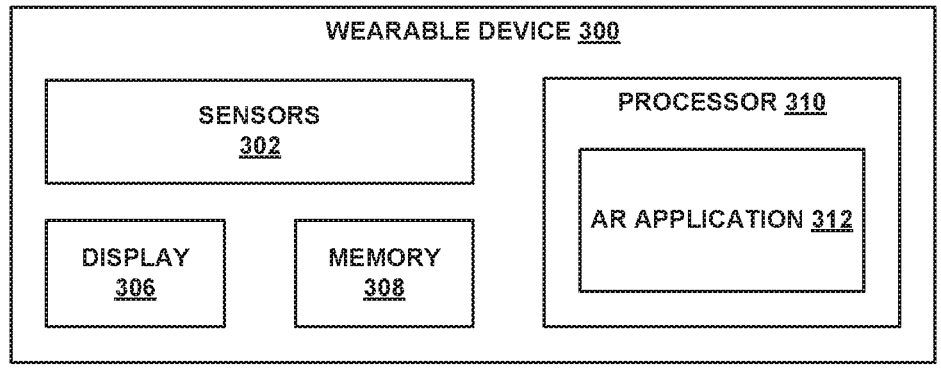
FIG. 3 is a block diagram illustrating an example embodiment of modules (e.g., components) of a wearable device.

FIG. 3 is a block diagram illustrating modules (e.g., components) of a wearable device 300, according to some example embodiments. The wearable device 300 may include sensors 302, a display 306, a memory 308, and a processor 310. For example, the wearable device 200 may be a wearable computing device, a vehicle computer, a tablet computer, a navigational device, a portable media device, or a smart phone of a user. The user may be a human user (e.g., a human being), a machine user (e.g., a computer configured by a software program to interact with the wearable device 300), or any suitable combination thereof (e.g., a human assisted by a machine or a machine supervised by a human).

The sensors 302 may include, for example, a proximity or location sensor (e.g, near field communication, GPS, Bluetooth, Wifi), an optical sensor (e.g., camera, infrared sensors, depth sensors), an orientation sensor (e.g., gyroscope), an audio sensor (e.g., a microphone), or any suitable combination thereof. For example, sensors 302 may include rear facing cameras and front facing cameras in the wearable device 300. It is noted that the sensors described herein are for illustration purposes and sensors 302 are thus not limited to the ones described.

The display 306 may include, for example, a touchscreen display configured to receive a user input via a contact on the touchscreen display. In one example, the display 306 may include a screen or monitor configured to display images generated by the processor 310. In another example, the display 306 may be transparent or semi-opaque so that a user can see through the display 306 (e.g., Head-Up Display).

Figure 4:
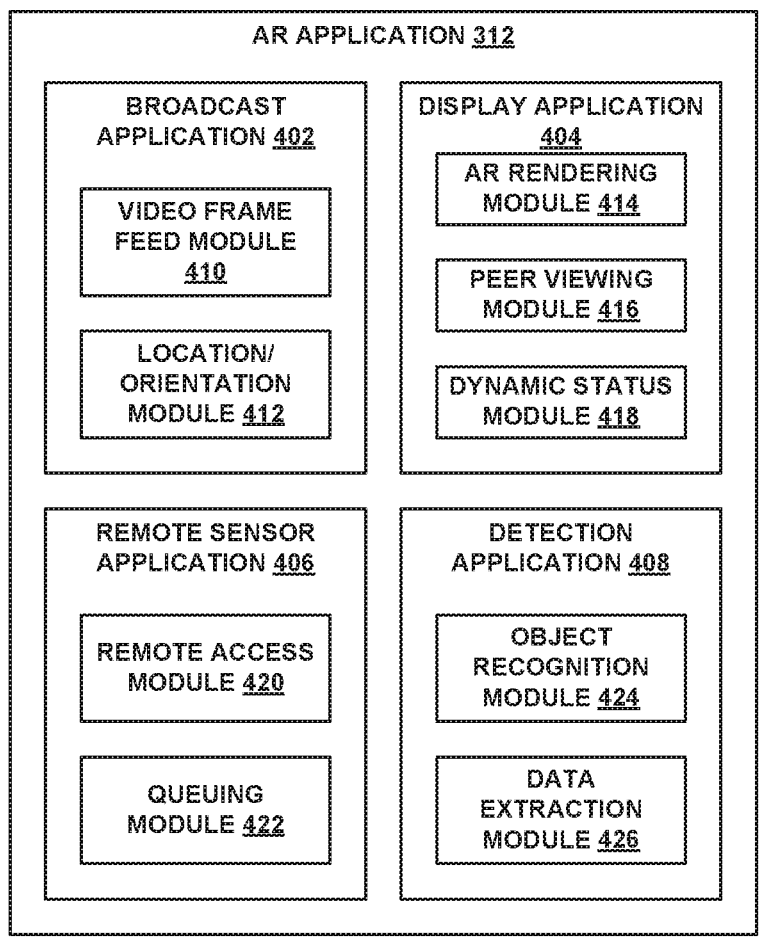
FIG. 4 is a block diagram illustrating an example embodiment of modules (e.g., components) of an augmented reality application.

The processor 310 may include an AR application 312 to enable the user of the wearable device 300 to experience augmented content. The AR application 312 also enables a remote user to remotely control sensors 302 on the wearable device 300. In one example embodiment, the AR application 312 may include a broadcast application 402, a display application 404, a remote sensor application 406, and a detection application 408 as illustrated in FIG. 4.

The broadcast application 402 may be configured to communicate data from the wearable device 300 to the server 118. For example, the broadcast application 402 may include a video frame feed module 410 and a location/orientation module 412. The video frame feed module 410 may be configured to send images and/or video frames captured using cameras from sensors 302. In another example, the video frame feed module 410 may be used to send a video feed based on video captured using the sensors 302. The location/orientation module 410 may be configured to determine the geographic location and the orientation of the wearable device 300. The geographic location may be determined using GPS, wifi, audio tone, light reading, and other means. The geographic location and orientation information may be relative to a physical object of interest. (e.g., apparatus 110). The orientation may be determined using an internal compass, an accelerometer, or a gyroscope in the wearable device 300 to determine where the wearable device 300 is located and in which direction the wearable device 300 is oriented.

The display application 404 may be configured to generated augmented data in the display 306. The augmented data may include, for example, virtual objects renderings, peer viewing, and dynamic status. In one embodiment, the display application 404 may include an AR rendering module 414, a peer viewing module 416, and a dynamic status module 418.

The AR rendering module 414 may be configured to generate a virtual object in the display 306. The AR rendering module 414 may include a local rendering engine that generates a visualization of a 3D virtual object overlaid (e.g., superimposed upon, or otherwise displayed in tandem with) on an image of a physical object captured by a camera of the wearable device 300 in the display 306. For example, the virtual object may include virtual knobs located on a physical door to illustrate where the knob is to be installed. In another example, the virtual object may include colored wiring schematics. A visualization of the 3D virtual object may be manipulated by adjusting a position of the physical object (e.g., its physical location, orientation, or both) relative to the wearable device 300. Similarly, the visualization of the 3D virtual object may be manipulated by adjusting a position camera of the wearable device 300 relative to the physical object.

In one example embodiment, the AR rendering module 414 may retrieve 3D models of virtual objects associated with a captured real world physical object. For example, the captured image may include a visual reference (also referred to as a marker) that consists of an identifiable image, symbol, letter, number, or machine-readable code. For example, the visual reference may include a bar code, a quick response (QR) code, or an image that has been previously associated with a three-dimensional virtual object (e.g., an image that has been previously determined to correspond to the three-dimensional virtual object). In one example embodiment, the AR rendering module 414 may include a manipulation module that identifies the physical object (e.g., a physical telephone), access virtual functions (e.g., increase or lower the volume of a nearby television) associated with physical manipulations (e.g., lifting a physical telephone handset) of the physical object, and generate a virtual function corresponding to a physical manipulation of the physical object.

The peer viewing module 416 may be configured to enable communication with a user of another wearable device. For example, the peer viewing module 416 may generate another display within the display 306 to show a video feed from the other wearable device. In an example scenario, the peer viewing module 416 may display a live video feed that shows how to run electrical wires. In another example, the peer viewing module 416 enables the ability to dynamically "mark up" or add information or other feedback onto the remote users display or through his/her other onboard feedback mechanisms (e.g., visual, audio, haptic).

The dynamic status module 418 may be configured to display the status of an activity related to one or more wearable devices. For example, the dynamic status module 418 may display that phase x of a project is completed based on the detection that all nails have been placed in the corresponding areas from the wearable devices. The dynamic status module 418 may indicate that an apparatus is functional or about to be overheated.

The remote sensor application 406 enables the server 118 to remotely access and control sensors 302 of the wearable device 300. In one example embodiment, the remote sensor application 406 includes a remote access module 420 and a queuing module 422. The remote access module 420 receives instructions from the server 118 to remote activate one or more sensors of the wearable device 300 and to broadcast the data from the activated sensor. For example, the server 118 may instructs to activate only front cameras of the wearable device 300. The remote access module 420 receives the instructions and activates the corresponding cameras in sensors 302. The broadcast application 402 then broadcast video feeds and other sensor data (e.g., depth sensor) from the activated cameras to the server 118. In another embodiment, the remote access module 420 accesses AR rendering module 414 to retrieve a 3D model corresponding to a physical object being captured and viewed by the activated cameras. The remote access module 420 instructs the broadcast application 402 to communicate the 3D model to the server 118.

In one example embodiment, the remote access module 420 receives instructions to capture images of a physical object. The remote access module 420 determines whether the physical object is within range of the wearable device 300. For example, a distance between the physical object and the wearable device 300 may be determined using various methods such as using depth sensors or geolocation data related to the physical object and the wearable device 300. Sensors 302 may be able to capture a video frame or other data with high resolution if the wearable device 300 is located within a threshold range or distance for sensors 302. The threshold range may thus depend on the type and quality of sensors 302 (e.g., resolution, optics). The remote access module 420 may determine that the distance between the wearable device 300 and the physical object of interest (e.g., apparatus 110) exceeds the threshold range or is not in a line of sight, the remote access module 420 may queue instructions from the server 118 to queuing module 422.

The queuing module 422 receives queuing instructions from remote access module 420 or the server 118. For example, the queuing instructions include a request that the wearable device 300 activates the sensors 302 and start broadcasting sensor data when the wearable device 300 is within the threshold range of the physical object of interest. In another example, the queuing instructions include a request that the wearable device 300 starts broadcasting data from selected sensors when the wearable device 300 is within the threshold range of the physical object of interest.

The detection application 408 identifies the physical object that the wearable device 300 is pointed and extracts data from the physical object. In one example embodiment, the detection application 408 includes an object recognition module 424 and a data extraction module 426. The object recognition module 424 may detect, generate, and identify identifiers such as feature points of the physical object being viewed or pointed at by the wearable device 300 using an optical device of the wearable device 300 to capture the image of the physical object. As such, the object recognition module 424 may be configured to identify one or more physical objects. The identification of the physical object may be performed in many different ways. For example, feature points of the physical objects based on several image frames of the physical objects. The identity of the physical object may be determined using any visual recognition algorithm. In another example, a unique identifier may be associated with the physical object. The unique identifier may be a unique wireless signal or a unique visual pattern such that the object recognition 424 can look up the identity of the physical object based on the unique identifier from a local or remote content database.

The data extraction module 426 determines a current reading from the physical object. For example, the reading could include an identity of analog or digital sensing device, a range of the analog or digital sensing device, a type of analog or digital sensing device based on an image of the analog or digital sensing device.

Referring back to FIG. 3, the memory 308 may be configured to store a database of visual references (e.g., images) and corresponding experiences (e.g., 3D virtual objects, interactive features of the 3D virtual objects). For example, the visual reference may include a machine-readable code or a previously identified image (e.g., a picture of a machine). The previously identified image of the machine may correspond to a 3D virtual model of the machine that can be viewed from different angles by manipulating the position of the wearable device 300 relative to the picture of the machine. Features of the 3D virtual machine may include selectable icons on the 3D virtual model of the machine. An icon may be selected or activated by tapping or moving on the wearable device 300.

In one example embodiment, the memory 308 may include a 3D model of equipment in the physical environment 102. For example, the memory 308 may include 3D models of the apparatus 110 and equipment 112.

In another example embodiment, the memory 308 includes a primary content dataset, a contextual content dataset, and a visualization content dataset. The primary content dataset includes, for example, a first set of images and corresponding experiences (e.g., interaction with 3D virtual object models). For example, an image may be associated with one or more virtual object models. The primary content dataset may include a core set of images of the most popular images determined by the server 118. The core set of images may include a limited number of images identified by the server 118. For example, the core set of images may include the images depicting covers of the ten most used machines in physical environment 102 and their corresponding experiences (e.g., virtual objects that represent the ten most used machines). In another example, the server 118 may generate the first set of images based on the most popular or often scanned images received at the server 118. Thus, the primary content dataset does not depend on objects or images scanned by the AR rendering module 424 of the wearable device 300.

The contextual content dataset includes, for example, a second set of images and corresponding experiences (e.g., 3D virtual object models) retrieved from the server 118. For example, images captured with the wearable device 300 that are not recognized (e.g., by the server 118) in the primary content dataset are submitted to the server 118 for recognition. If the captured image is recognized by the server 118, a corresponding experience may be downloaded at the wearable device 300 and stored in the contextual content dataset. Thus, the contextual content dataset relies on the context in which the wearable device 300 has been used. As such, the contextual content dataset depends on objects or images scanned by the AR rendering module 424 of the wearable device 300.

In one embodiment, the wearable device 300 may communicate over the network 116 with the server 118 to retrieve a portion of a database of visual references, corresponding 3D virtual objects, and corresponding interactive features of the 3D virtual objects. The network 116 may be any network that enables communication between or among machines, databases, and devices (e.g., the wearable device 300). Accordingly, the network 116 may be a wired network, a wireless network (e.g., a mobile or cellular network), or any suitable combination thereof. The network 116 may include one or more portions that constitute a private network, a public network (e.g., the Internet), or any suitable combination thereof.

Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

Figure 5:
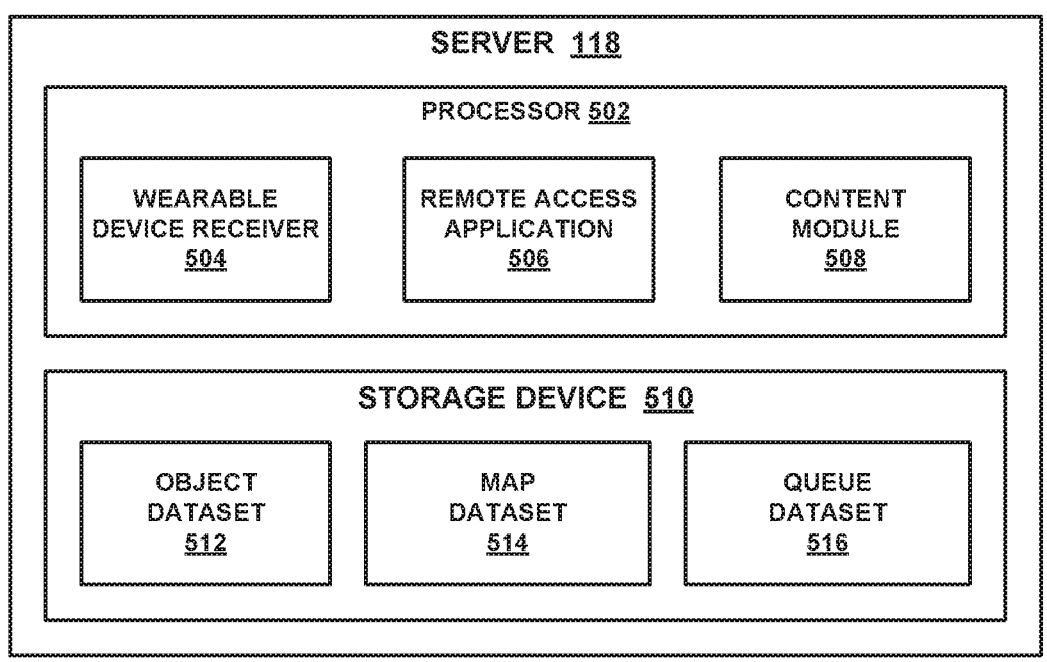
FIG. 5 is a block diagram illustrating an example embodiment of a server.

FIG. 5 is a block diagram illustrating modules (e.g., components) of the server 118. The server 118 includes a processor 502 and a storage device 510. The processor 502 includes a wearable device receiver 504, a remote access application 506, and a content module 508.

The wearable device receiver 504 may interface and communicate with sensors from the wearable device to obtain data related to video feeds, image feeds, audio feed, depth sensor data, a geographic position, a location, and an orientation of the wearable device 300.

The remote access application 506 generates instructions to the wearable devices. The remote access application 506 enables the server 118 to remotely access sensors 302 of the wearable device 300. In one example embodiment, the remote access application 506 identifies one or more wearable devices associated with the physical environment 102 and communicates instructions to the wearable devices to remote activate one or more sensors of the wearable device 300 and to receive data from the activated sensors. For example, the remote access application 506 may instruct to activate only front cameras of the wearable device 300. The remote access application 506 sends the instructions to activate the corresponding cameras in the corresponding wearable devices. The remote access application 506 receives video feeds and other sensor data (e.g., depth sensor) from the activated cameras. In another embodiment, the remote access application 506 receives a 3D model corresponding to a physical object being captured and viewed by the activated cameras from the corresponding wearable devices.

In one example embodiment, the remote access application 506 generates instructions to capture images of a physical object. The remote access application 506 determines whether the physical object is within range of the wearable device 300 using the geolocation of the wearable device 300 and the physical object. For example, a distance between the physical object and the wearable device 300 may be determined using various methods such as using depth sensors or geolocation data related to the physical object and the wearable device 300. When the remote access application 506 may determine that the distance between the wearable device 300 and the physical object of interest (e.g., apparatus 110) exceeds the threshold range or is not in a line of sight, the remote access application 506 may queue instructions to queuing module 422 of the wearable device 300. For example, the queuing instructions include a request that the wearable device 300 activates the sensors 302 and start broadcasting sensor data when the wearable device 300 is within the threshold range of the physical object of interest. In another example, the queuing instructions include a request that the wearable device 300 starts broadcasting data from selected sensors when the wearable device 300 is within the threshold range of the physical object of interest.

The content module 508 identifies the physical object that the wearable device 300 is pointed and extracts data from the physical object. In one example embodiment, the content module 508 may detect, generate, and identify identifiers such as feature points of the physical object being viewed or pointed at by the wearable device 300 using an optical device of the wearable device 300 to capture the image of the physical object. As such, the content module 508 may be configured to identify one or more physical objects. The identification of the physical object may be performed in many different ways. For example, feature points of the physical objects based on several image frames of the physical objects. The identity of the physical object may be determined using any visual recognition algorithm. In another example, a unique identifier may be associated with the physical object. The unique identifier may be a unique wireless signal or a unique visual pattern such that the content module 508 can look up the identity of the physical object based on the unique identifier from a local or remote content database.

The content module 508 may also determine a current reading from the physical object. For example, the reading could include an identity of analog or digital sensing device, a range of the analog or digital sensing device, a type of analog or digital sensing device based on an image of the analog or digital sensing device. The content module may include a rendering engine that generates a model of a virtual object.

The storage device 510 may store an object dataset 512, a map dataset 514, and a queuing dataset 516. The object dataset 512 may include references related to physical objects. The object dataset 512 may include a 3D model of physical objects and other objects related to the physical object. For example, the object dataset 512 may include a 3D model of a machine or tool. The object dataset 512 may include extracted sensor data generated by the content module 508.

The map dataset 514 may store a geographic map such as a floor plan or a factory map. The map may include identifications of location of machines, tools, and equipment in the geographic map. The map may also identify an architecture system, the types of machine and how the machines may be connected to each other and a monitoring system.

The queuing dataset 516 may include instructions generated by the remote access application 506. The instructions may identify one or more wearable devices in a physical environment, one or more sensors to be activated, a physical object of interest, a sensor range, a field of use range, and a threshold range.

Figure 6:
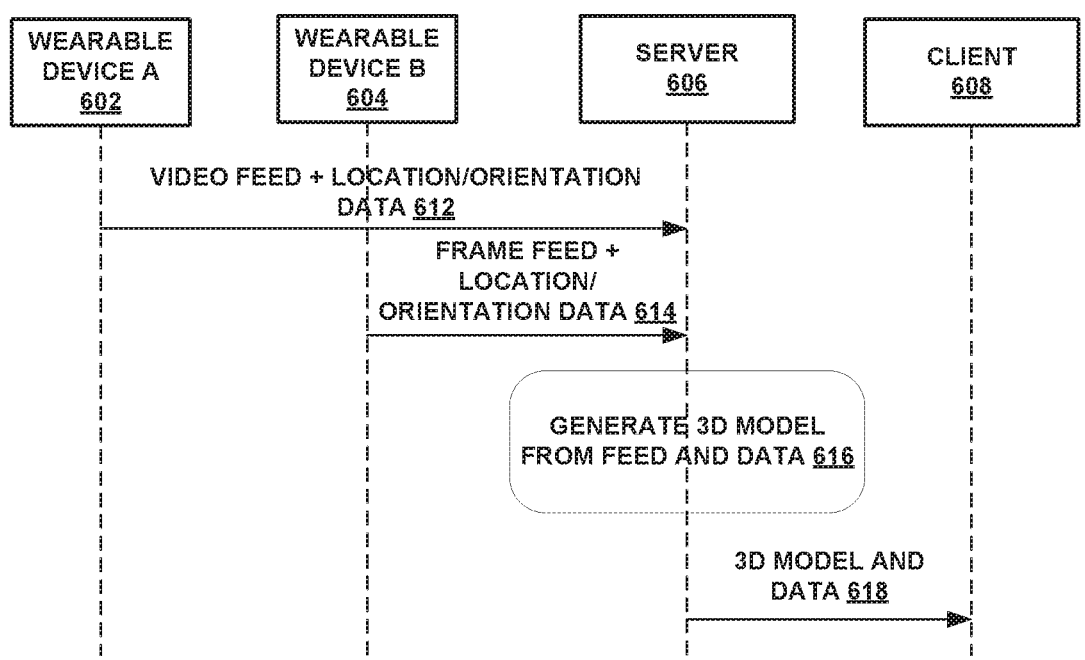
FIG. 6 is an interaction diagram illustrating an example embodiment of remotely accessing sensor data from wearable devices.

FIG. 6 is an interaction diagram illustrating an example embodiment of remotely accessing sensor data from wearable devices. At operation 612, a wearable device 602 sends its video feeds, location, and orientation data to a server 606. At operation 614, a wearable device 604 sends its video feeds, location, and orientation data to the server 606. The server 606 can generate 3D models from a video feed and data received from wearable devices 602 and 604 at operation 616. At operation 618, a client 608 accesses the 3D models and data from the server 606.

Figure 7:
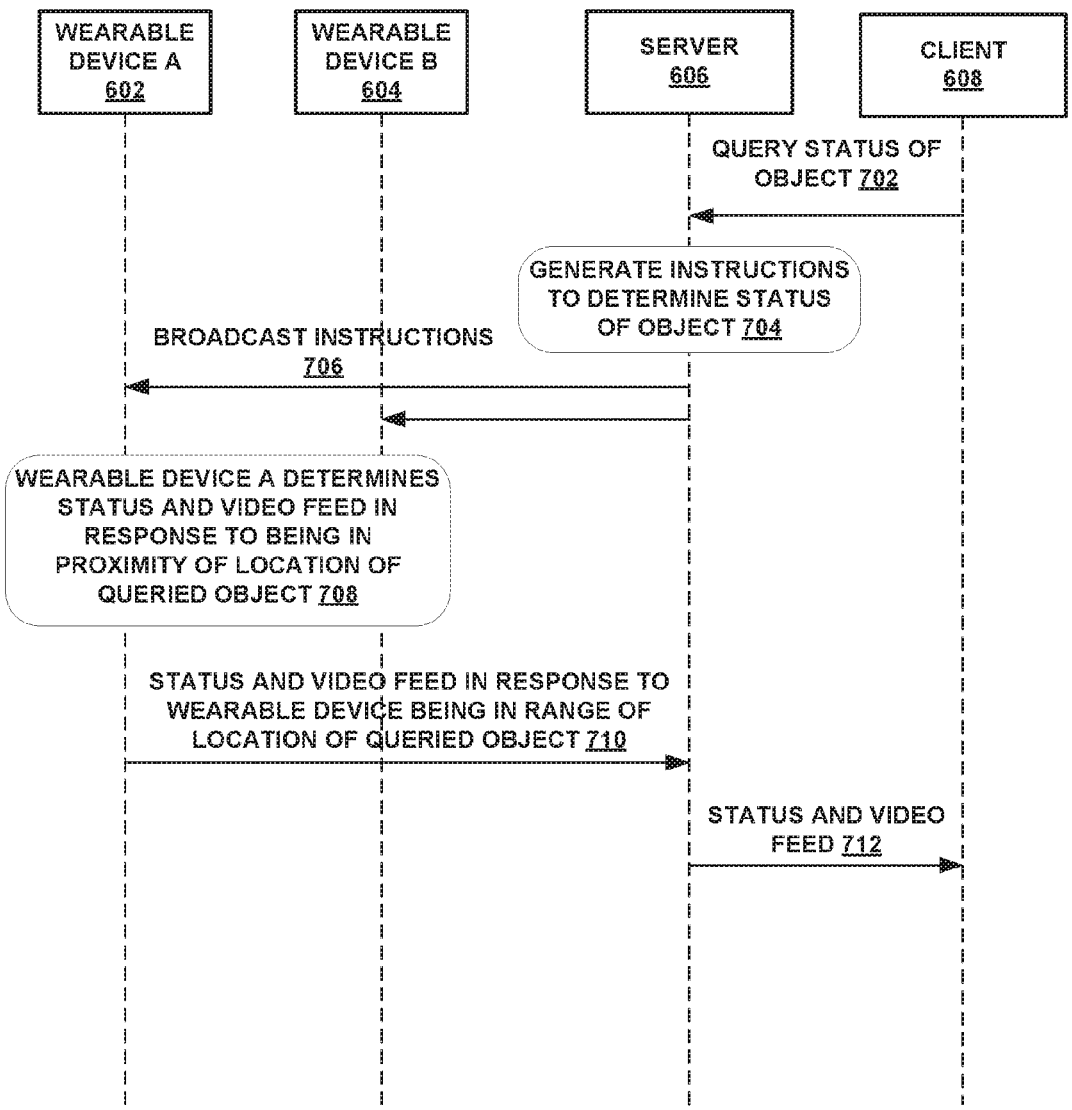
FIG. 7 is an interaction diagram illustrating an example embodiment of remotely querying sensor data from wearable devices.

FIG. 7 is an interaction diagram illustrating an example embodiment of remotely querying sensor data from wearable devices. At operation 702, the client 608 submits a query status of a physical object at plant to server 606. At operation 704, the server 606 generates instructions to determine a status of the physical object to corresponding wearable devices in the plant. At operation 706, the server 606 broadcasts the instructions to corresponding wearable devices 602 and 604. At operation 708, wearable device 602 determines that it is in proximity to the location of the queried physical object, activates sensors to capture a status of the physical object. At operation 710, wearable device 602 communicates the status and video feed in response to wearable device being in range of the location of the queried object. At operation 712, the server 606 provides the status and video feed to the client 608.

Figure 8:
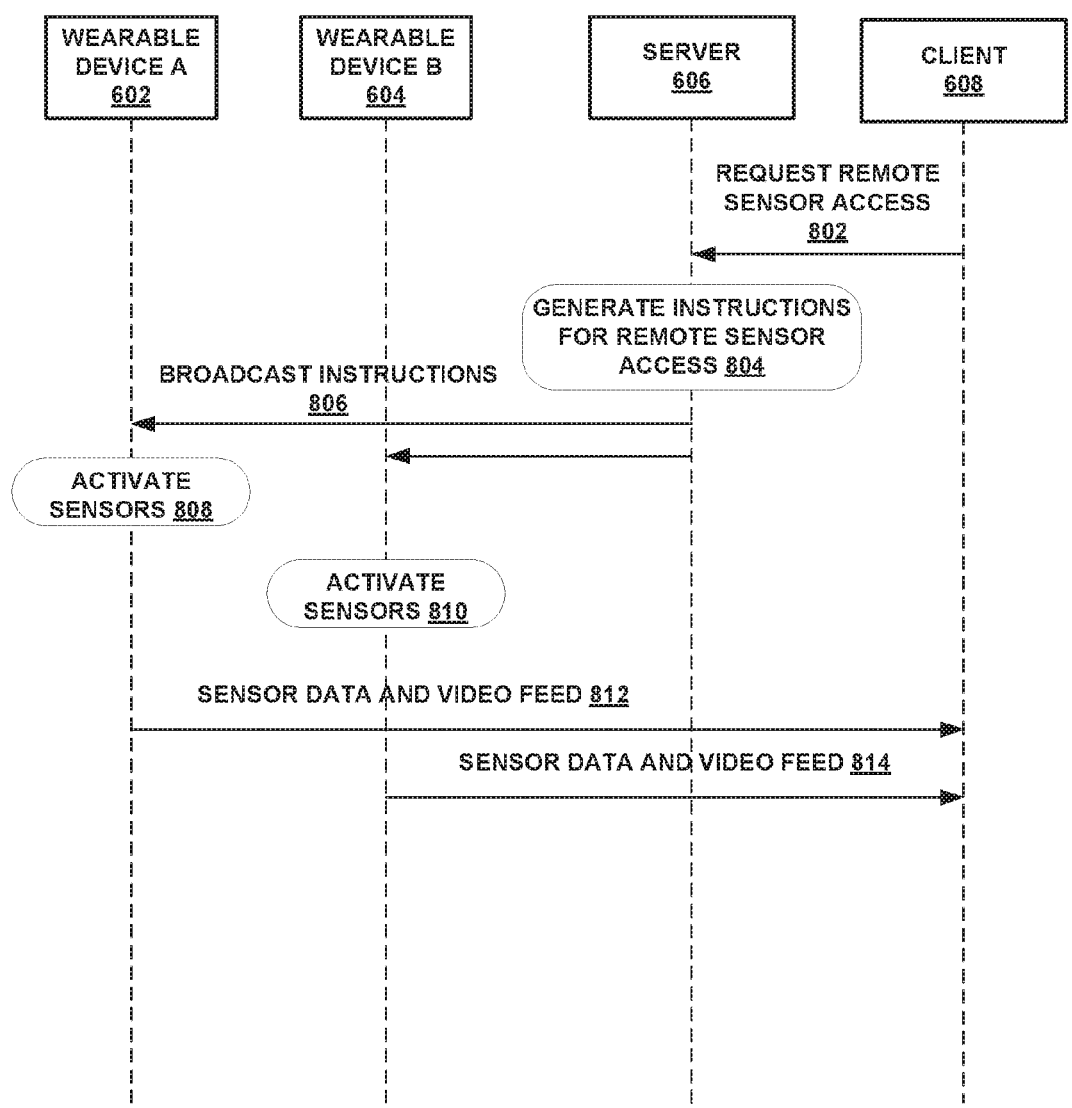
FIG. 8 is an interaction diagram illustrating another example embodiment of remotely querying sensor data from wearable devices.

FIG. 8 is an interaction diagram illustrating another example embodiment of remotely querying sensor data from wearable devices. At operation 802, client 608 submits a request to remotely activate sensors from wearable devices 602 and 604. At operation 804, server 606 generates instructions to remote sensor access of the corresponding wearable devices. At operation 806, server 606 broadcasts the instructions to wearable devices 602 and 604. At operation 808, wearable device 602 activates its sensors. At operation 810, wearable device 604 activates its sensors. At operation 812, wearable device 602 provides its sensor data and video feed to client 608. At operation 814, wearable device 604 provides its sensor data and video feed to client 608.

Figure 9:
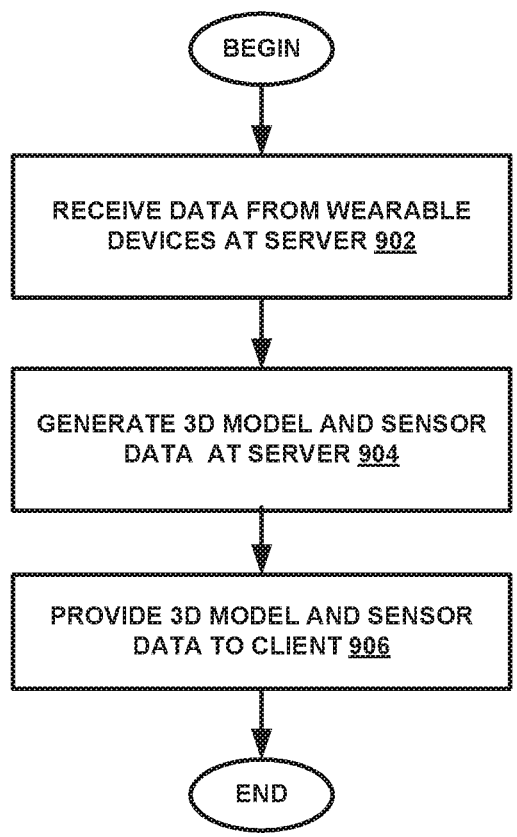
FIG. 9 is a flowchart illustrating an example method for remotely accessing sensor data from wearable devices.

FIG. 9 is a flowchart illustrating an example method for remotely accessing sensor data from wearable devices. At operation 902, a server receives data from wearable devices. In one example embodiment, operation 902 may be implemented using, for example, wearable device receiver 504 of server 118. At operation 904, the server generates a 3D model using the sensor data from the wearable devices. In one example embodiment, operation 904 may be implemented using, for example, remote access application 506 or content module 508 of server 118. At operation 906, the server communicates the 3D model and sensor data to a client.

Figure 10:
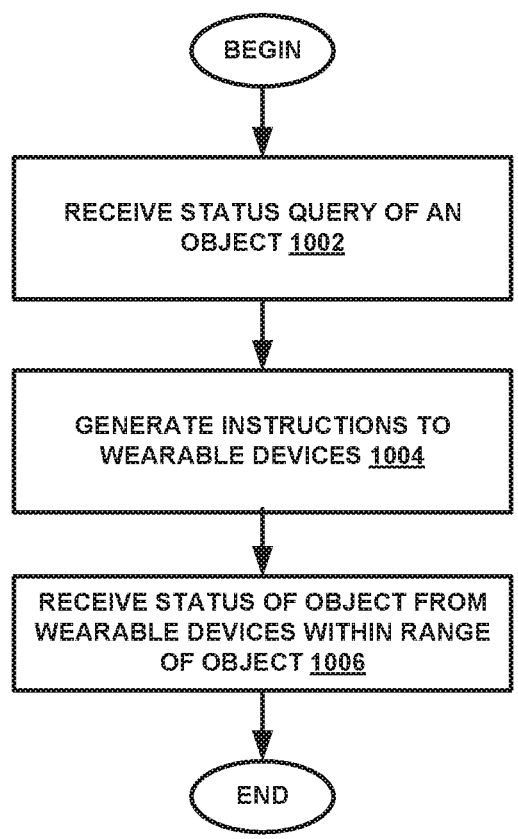
FIG. 10 is a flowchart illustrating an example method for remotely querying sensor data from wearable devices.

FIG. 10 is a flowchart illustrating an example method for remotely querying sensor data from wearable devices. At operation 1002, a server receives a status query of a physical object. At operation 1004, the server generates instructions to the corresponding wearable devices. In one example embodiment, operation 1004 may be implemented using, for example, remote access application 506 or content module 508 of server 118. At operation 1006, the server receives status of the physical object from the corresponding wearable devices that are within range of the physical object.

Figure 11:
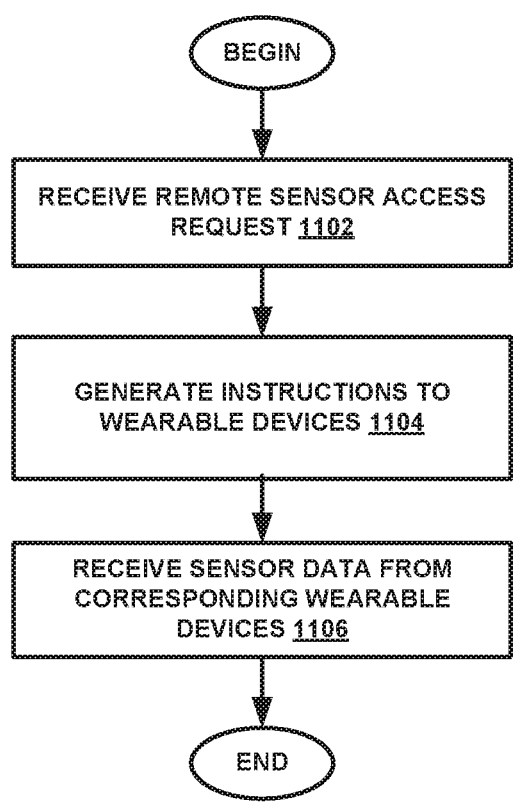
FIG. 11 is a flowchart illustrating another example method for remotely querying sensor data from wearable devices.

FIG. 11 is a flowchart illustrating another example method for remotely querying sensor data from wearable devices. At operation 1102, a server receives a remote sensor access request. At operation 1104, the server generates instructions to the corresponding wearable devices. In one example embodiment, operation 1104 may be implemented using, for example, remote access application 506 or content module 508 of server 118. At operation 1106, the server receives sensor data from the corresponding wearable devices.

Modules, Components and Logic

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses that connect the hardware modules). In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network 116 and via one or more appropriate interfaces (e.g., APIs).

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

A computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures merit consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 12:
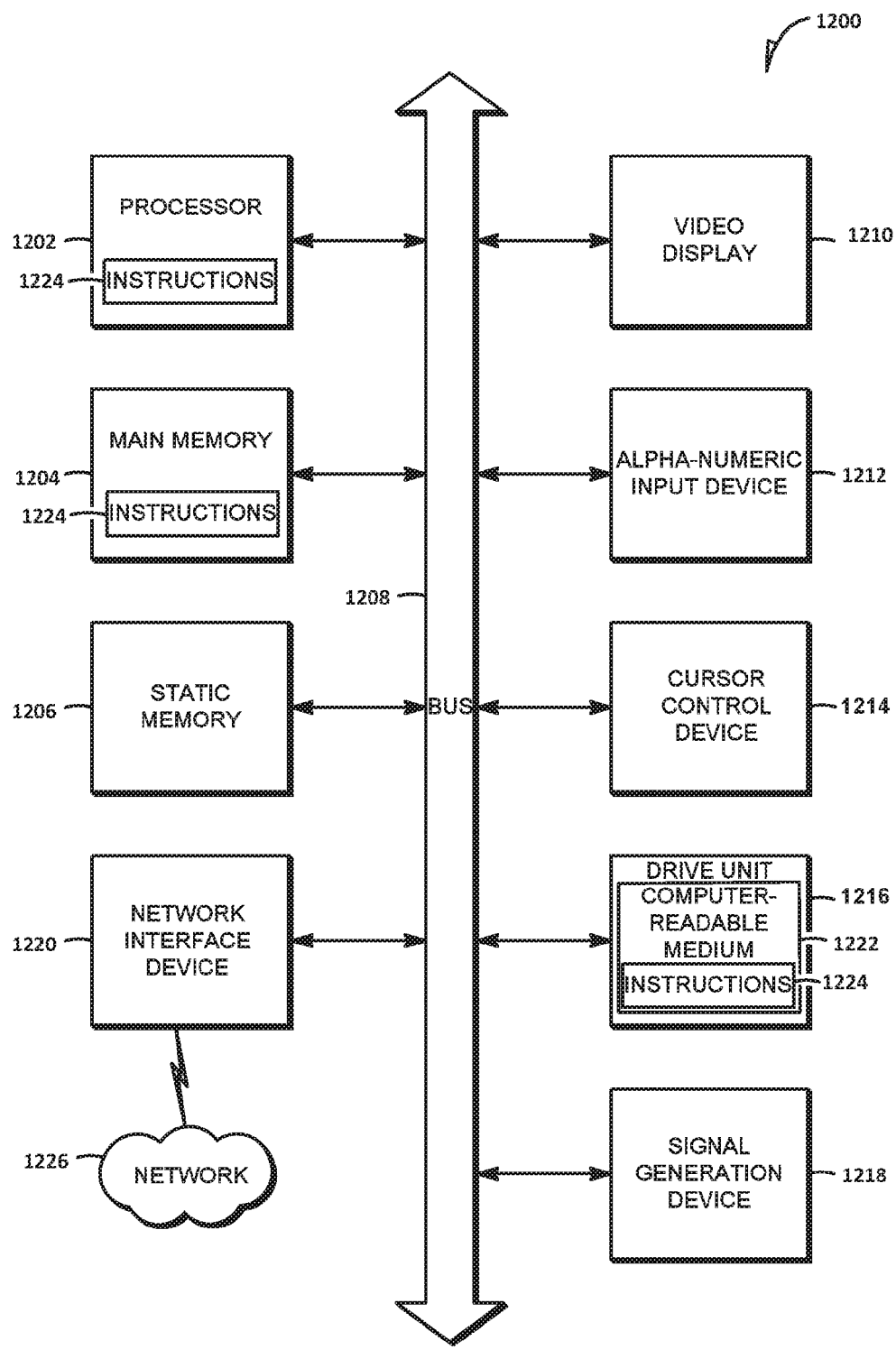
FIG. 12 is a block diagram illustrating components of a machine, according to some example embodiments, able to read instructions from a machine-readable medium and perform any one or more of the methodologies discussed herein.

FIG. 12 is a block diagram of a machine in the example form of a computer system 1200 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a survey server 118 or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204 and a static memory 1206, which communicate with each other via a bus 1208. The computer system 1200 may further include a video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a disk drive unit 1216, a signal generation device 1218 (e.g., a speaker) and a network interface device 1220.

Machine-Readable Medium

The disk drive unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding or carrying instructions 1224 for execution by the machine and that cause the machine to perform any one or more of the methodologies of the present embodiments, or that is capable of storing, encoding or carrying data structures utilized by or associated with such instructions 1224. The term "machine-readable medium" shall accordingly be taken to include, but not be limited to, solid-state memories, and optical and magnetic media. Specific examples of machine-readable media 1222 include non-volatile memory, including by way of example semiconductor memory devices (e.g., erasable programmable read-only memory (EPROM), electrically erasable programmable read-only memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

Transmission Medium

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding, or carrying instructions 1224 for execution by the machine, and includes digital or analog communications signals or other intangible media to facilitate communication of such software.

Example Mobile Device

Figure 13:
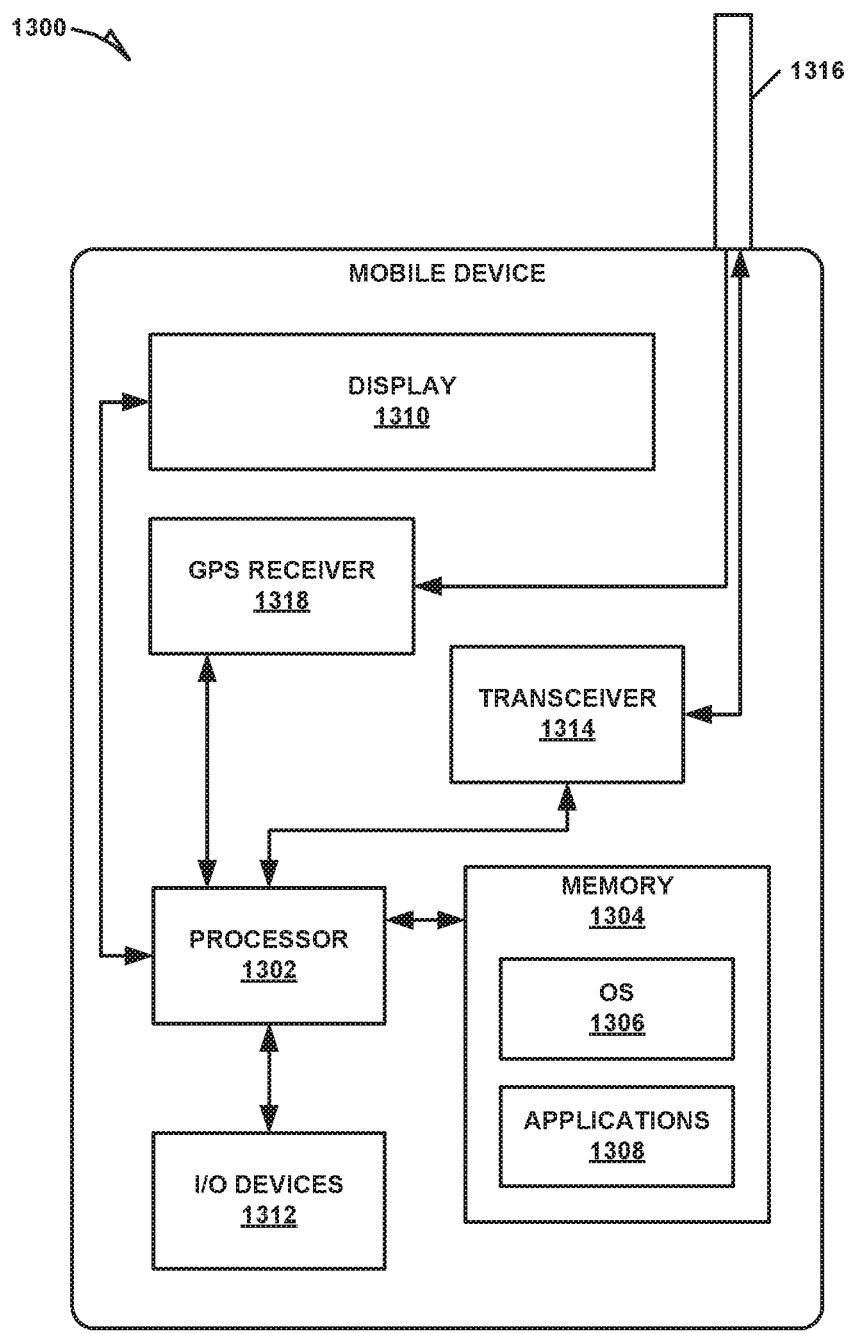
FIG. 13 is a block diagram illustrating a mobile device, according to an example embodiment.

FIG. 13 is a block diagram illustrating a mobile device 1300, according to an example embodiment. The mobile device 1300 may include a processor 1302. The processor 1302 may be any of a variety of different types of commercially available processors 1302 suitable for mobile devices 1300 (for example, an XScale architecture microprocessor, a microprocessor without interlocked pipeline stages (MIPS) architecture processor, or another type of processor 1302). A memory 1304, such as a random access memory (RAM), a flash memory, or other type of memory, is typically accessible to the processor 1302. The memory 1304 may be adapted to store an operating system (OS) 1306, as well as application programs 1308, such as a mobile location enabled application that may provide LBSs to a user 102. The processor 1302 may be coupled, either directly or via appropriate intermediary hardware, to a display 1310 and to one or more input/output (I/O) devices 1312, such as a keypad, a touch panel sensor, a microphone, and the like.

Similarly, in some embodiments, the processor 1302 may be coupled to a transceiver 1314 that interfaces with an antenna 1316. The transceiver 1314 may be configured to both transmit and receive cellular network signals, wireless data signals, or other types of signals via the antenna 1316, depending on the nature of the mobile device 1300. Further, in some configurations, a GPS receiver 1318 may also make use of the antenna 1316 to receive GPS signals.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A device comprising:
   one or more hardware processors;
   a memory storing instructions that, when executed by the one or more hardware processors, configure the device to perform operations comprising:
   receiving a query to identify a physical object and a sensor reading from a sensor of the physical object;

identifying a first wearable device from a plurality of wearable devices, the first wearable device being within a detection range of the physical object in response to the query;

generating instructions to the first wearable device to extract the sensor reading from the sensor of the physical object;

receiving sensor data from the first wearable device in response to the instructions, the sensor data comprising the sensor reading; and building a three-dimensional model of the physical object based on the sensor data.

2. The device of claim 1, wherein the first wearable device comprises a camera, a depth sensor, an inertial sensor, and a transparent display that displays augmented reality content based on the sensor data.

3. The device of claim 2, wherein the operations further comprise:
remotely activating the camera, the depth sensor, and the inertial sensor of the first wearable device.

4. The device of claim 1, wherein the sensor data further comprises a video feed from the first wearable device, depth sensor data from the first wearable device, an orientation of the first wearable device, and a location of the first wearable device.

5. The device of claim 1, wherein the query further identifies a location of the physical object.

6. The device of claim 1, wherein the operations further comprise:
generating analytics data processed by a server to provide an information including one of a location of the physical object being detected, a location of the three-dimensional model of the physical object being detected, a location of the physical object being triggered, a location of the three-dimensional model of the physical object being triggered, a duration of the physical object being detected, a duration of the three-dimensional model of the physical object being detected and a combination thereof.

7. The device of claim 1, wherein the operations further comprise:
determining whether the first wearable device is within the detection range of the physical object based on a distance between the first wearable device and the physical object.

8. The device of claim 7, wherein the detection range corresponds to a threshold range within where the three-dimensional model of the physical object is built based on the sensor data.

9. The device of claim 1, wherein the sensor data from the first wearable device is generated at a rate that is based on at least the relative distance between the plurality of wearable devices or the distances between each of the wearable devices and the physical object.

10. The device of claim 9, wherein the rate increases in response to the distance between the first wearable device and the physical object decreasing.

11. A method comprising:
receiving a query to identify a physical object and a sensor reading from a sensor of the physical object;
identifying a first wearable device from a plurality of wearable devices, the first wearable device being within a detection range of the physical object in response to the query;
generating instructions to the first wearable device to extract the sensor reading from the sensor of the physical object;
receiving sensor data from the first wearable device in response to the instructions, the sensor data comprising the sensor reading; and
building a three-dimensional model of the physical object based on the sensor data.

12. The method of claim 11, wherein the first wearable device comprises a camera, a depth sensor, an inertial sensor, and a transparent display that displays augmented reality content based on the sensor data.

13. The method of claim 12, further comprising:
remotely activating the camera, the depth sensor, and the inertial sensor of the first wearable device.

14. The method of claim 11, wherein the sensor data further comprises a video feed from the first wearable device, depth sensor data from the first wearable device, an orientation of the first wearable device, and a location of the first wearable device.

15. The method of claim 11, wherein the query further identifies a location of the physical object.

16. The method of claim 11, further comprising:
generating analytics data processed by a server to provide an information including one of a location of the physical object being detected, a location of the three-dimensional model of the physical object being detected, a location of the physical object being triggered, a location of the three-dimensional model of the physical object being triggered, a duration of the physical object being detected, a duration of the three-dimensional model of the physical object being detected and a combination thereof.

17. The method of claim 11, further comprising:
determining whether the first wearable device is within the detection range of the physical object based on a distance between the first wearable device and the physical object.

18. The method of claim 17, wherein the detection range corresponds to a threshold range within where the three-dimensional model of the physical object is built based on the sensor data.

19. The method of claim 11, wherein the sensor data from the first wearable device is generated at a rate that is based on at least the relative distance between the plurality of wearable devices or the distances between each of the wearable devices and the physical object.

20. A non-transitory machine-readable medium comprising instructions that, when executed by one or more processors of a machine, cause the machine to perform operations comprising:
receiving a query to identify a physical object and a sensor reading from a sensor of the physical object;
identifying a first wearable device from a plurality of wearable devices, the first wearable device being within a detection range of the physical object in response to the query;
generating instructions to the first wearable device to extract the sensor reading from the sensor of the physical object;
receiving sensor data from the first wearable device in response to the instructions, the sensor data comprising the sensor reading; and
building a three-dimensional model of the physical object based on the sensor data.

* * * * *